Oct. 16, 1951     T. SAULINO     2,571,766
INJECTION MOLDING APPARATUS
Filed Aug. 8, 1949     2 SHEETS—SHEET 1
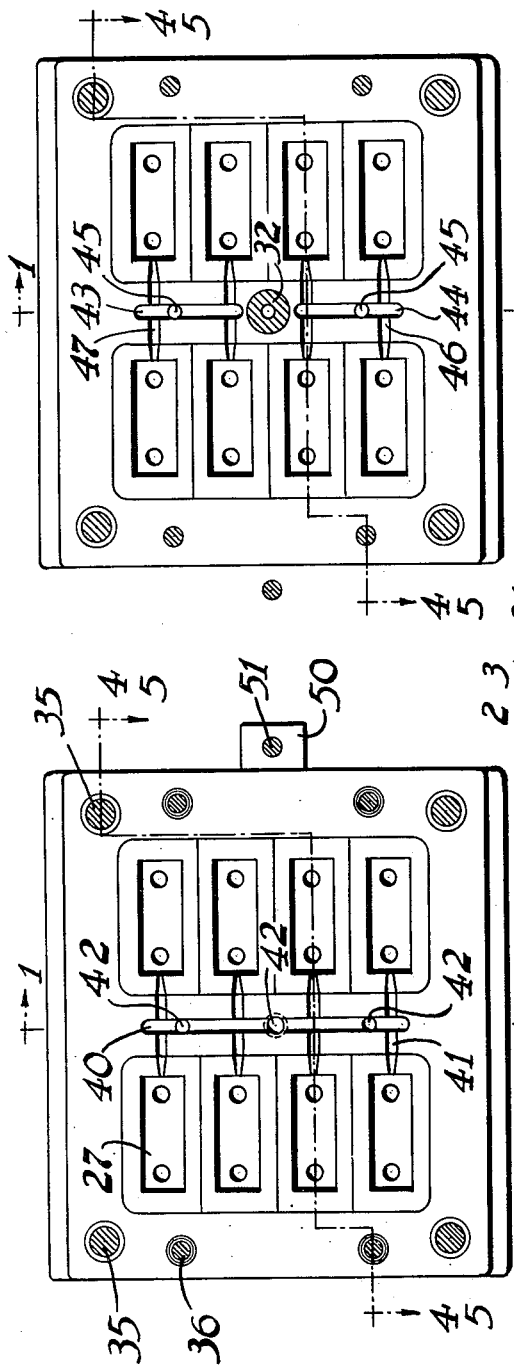
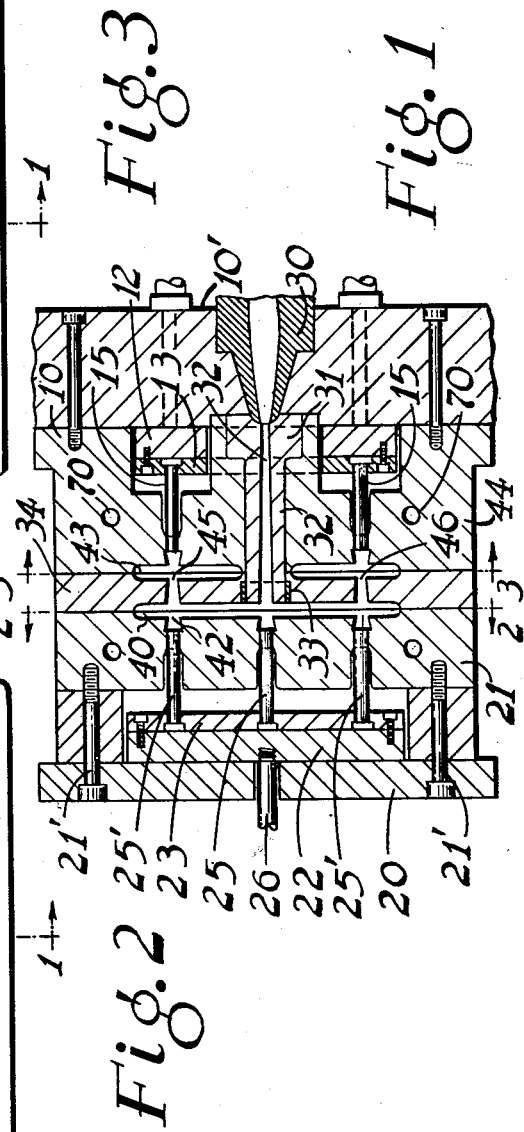
Theodore Saulino Inventor
By
William A. Zalesak Attorney Oct. 16, 1951  T. SAULINO  2,571,766
INJECTION MOLDING APPARATUS
Filed Aug. 8, 1949  2 SHEETS—SHEET 2
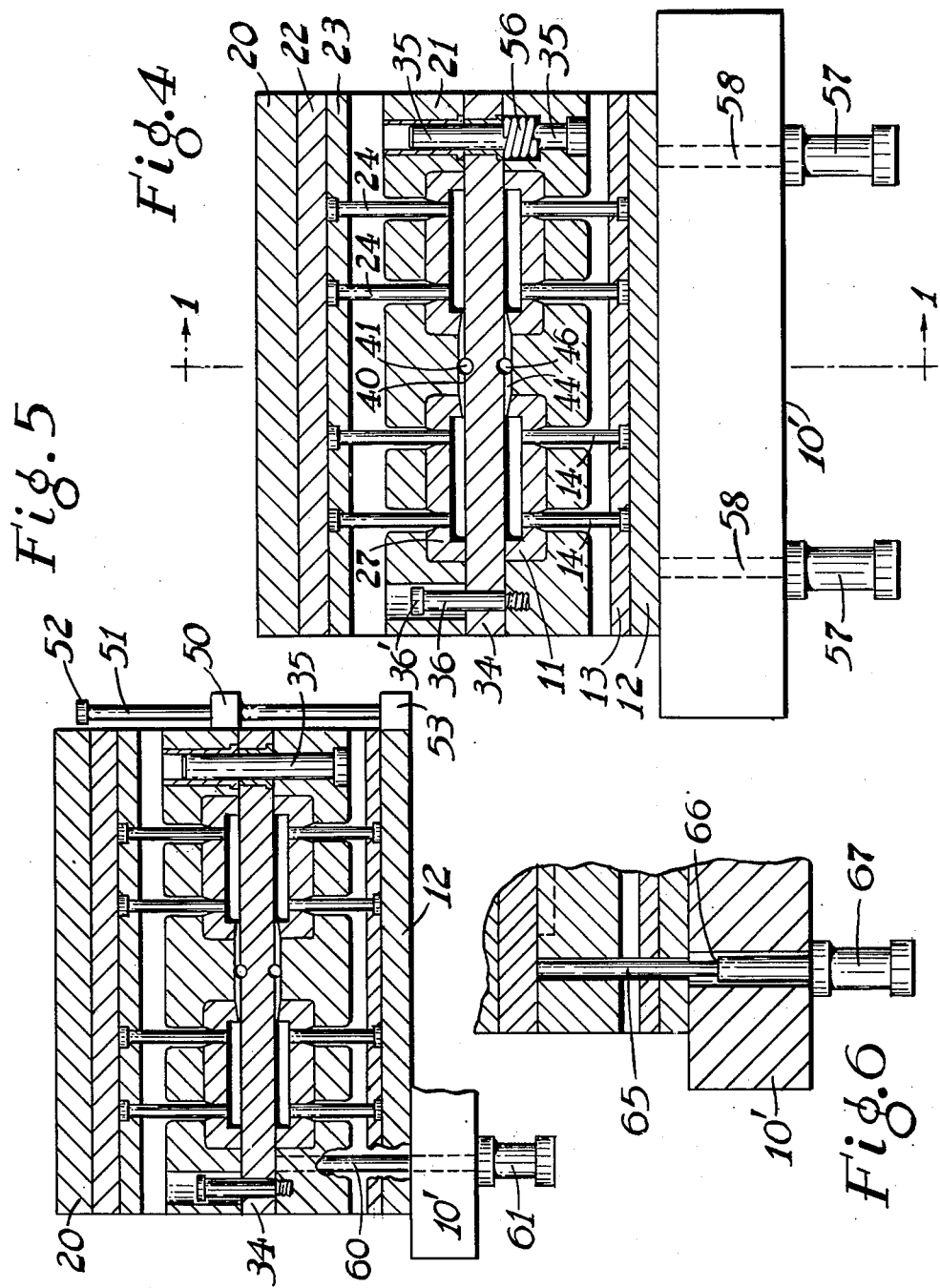
Theodore Saulino Inventor
By William A. Zalesak Attorney Patented Oct. 16, 1951

2,571,766

UNITED STATES PATENT OFFICE 2,571,766

INJECTION MOLDING APPARATUS

Theodore Saulino, Newark, N. J.

Application August 8, 1949, Serial No. 109,110

7 Claims. (Cl. 18—30)

My invention relates to apparatus for press moulding articles such as injection moulding machines and more particularly to improvements in the mold therefore.

In apparatus of this kind the mechanism in which the molds are mounted usually comprises a stationary platen and a movable platen, these platens being closed in registering relationship to permit plastic material to be injected into the molds formed by the closure of the platens. The material is usually fed from a machine nozzle through a sprue bushing having a sprue hole communicating with main and side runners, then into gates terminating in the cavity proper. After the material is injected into the cavities and sets, the movable platen is moved away from the stationary platen and the knockout pins carried by knockout plate mounted on the platens are moved against the molded pieces to eject them from the cavities.

One conventional apparatus of this kind is capable of producing a maximum or overall moulding pressure of 10 tons per square inch with a clamping pressure of 300 tons, and on which approximately 30 square inches of projected area can be molded at one time. The movable platen rides on four tie rods. In some cases, due to the area of the molded articles, only a certain number of cavities can be made in order that the mold can fit in between the press tie rods. Under these conditions the cavities may use only one half to two-thirds of the machine capacity, thus increasing the cost per unit of article molded. To increase capacity by using multiple layer cavities introduces problems of injection and, hence, up to the present time has not been feasible. The problems involve the arrangement of the sprue holes, the runners, the knockout plates and pins and all the movable parts of the moulding portion of the molding machine.

It is therefore a principal object of my invention to provide an improved moulding apparatus in which the capacity of the device may be increased.

A more specific object of my invention is to provide a multiple plane injection apparatus in which it is possible to mold objects in a plurality of planes.

Another object of my invention is to provide an improved apparatus of this type having novel arrangement of sprue holes and runners making possible the use of multiple plane injection.

A still further object of my invention is to provide a moulding apparatus using multiple plane injection, having novel means for moving the intermediate platens or center plates and the knockout plates and pins.

These and other objects will appear hereinafter.

Briefly in accordance with my invention I provide a stationary platen or cavity mould support and a movable platen or cavity mould support, and intermediate these platens one or more movable inter-platens or center plates which cooperate with the cavity mould platens and may also carry portions of the mould. This provides multiple plane injection cavities permitting molding in two or more planes, thereby increasing machine output and reducing unit cost. The sprue and runners are so arranged that the plastic material is forced first against the movable platen and then back through the one or more center plates to the fixed platen for purposes to be described. Various means are provided for moving the movable platen, center plate and knockout plates with their associated pins in a predetermined order so as to insure ejection of the material formed in the sprue as well as in the cavity moulds.

Other objects and advantages will be apparent from the following description of the invention, pointed out in particularity in the appended claims and taken in connection with the accompanying drawings in which:

Figure 1 is a vertical section taken along the line 1—1 of Figure 2; Figures 2 and 3 are vertical sections taken along the lines 2—2 and 3—3, respectively of Figure 1; Figure 4 is a horizontal section taken along the line 4—4 of Figure 2; Figure 5 is a longitudinal section taken along the line 5—5 of Figure 2, slightly modified; and Figure 6 shows a partial longitudinal section of a modification of the devices shown in Figures 4 and 5.

Inasmuch as the mechanism for injecting the plastic material into the moulds and the rest of the moulding machine forms no part of the present invention, only the apparatus involving the moulds per se, is shown in the drawings and described in connection with my invention.

Referring first to Figures 1 and 4, I provide in accordance with my invention a stationary platen or cavity mould support 10, 10' supporting a plurality of cavity moulds 11 and movable knockout plates 12 and 13 to which are affixed the knockout pins 14 which register with the cavity moulds 11 and are movable therein when the knockout plates are operated to eject the molded products. The knockout plate 12 also carries the sprue lock pins 15 for purposes to be described. The stationary platen is also provided with the sprue 32 having the tapered sprue hole 32' and the enlarged portion 31 for receiving the end of the nozzle 30 through which the plastic material is injected into the moulds at the proper time.

Oppositely disposed to the fixed platen 10 is the movable platen 20 which may be moved by the hydraulic mechanism, not shown, of the injection press. This platen is provided with a cavity mould support member 21 fixed to the movable platen 20 by means of bolts 21'. This movable platen carries the cavity moulds 27. Movably supported within the movable platen are the knockout plates 22 and 23 supporting the knockout pins 24 associated with the moulds and the sprue lock pin 25 and lock pins 25'. These knockout plates and pins are moved by the ejector rod 26.

In accordance with my invention I provide one or more center plates or intermediate platens 34 which ride on the guide pins 35 mounted in the fixed platen 10. This movable center plate is provided with a bushing 33 into which the sprue 32 is movable, and may be either flat or provided with the mold portions 11' and 27' cooperating with the moulds in the fixed and movable platens.

The arrangement of the cavity mould main runner, side runners and gates opening into the cavity moulds are best shown in Figures 2 and 3, which are vertical sections taken along the lines 2—2 and 3—3 of Figure 1. The movable cavity mould support is provided with a plurality of cavity moulds 27 as shown. These are connected to a main runner 40 by means intermediate side runners 41 opening directly through gates into the cavities. The plate is provided with the undercut portions opening into apertures 42 for the purpose of withdrawing the material in the runner 40 and the sprue 36' when the movable platen is moved to the left as seen in Figure 1. Knockout plates 22, 23 carrying knock-out pin 24 and lock pins 25 and 25' are carried by the movable platen. The center plate 34 may be provided with moulds or may be flat surfaced depending upon the article to be molded.

It will be noted that the sprue hole 32' communicates with the runner 40 in the movable platen and that material then flows back through the center plate through the passageway 44 and 45 into the main runners 43, 44 having side runner 46 and 47. The plastic material should first be injected into the movable platen and then out toward the front platen in order that the moulded material in the sprue hole 32' can be withdrawn from the sprue hole, which is one of the problems involved in attempting to provide multiple plane injection, according to my invention.

With the arrangement shown whereby the sprue extends through the center plate it is necessary to move the center plate only a short distance to permit the moulded articles to be ejected, since the movable platen moves the required distance for removing the material in the sprue hole. If this were not done heavy springs would be required in order to separate the center plate and the fixed platen a sufficient distance to remove the material in the sprue hole. This also has the advantage of eliminating the necessity for a pin in the center plate to eject the sprue, which would be required if the center plate were relied upon to pull the moulded material from the sprue hole.

In operation the movable platen 20 is first moved to the left by suitable means, preferably by the hydraulic mechanism of the press. This platen in accordance with my invention is moved approximately 10½" in one machine so that the moulded pieces in the cavities 27 as well as the material in the sprue hole 32' and the material in the sprue holes 45 and 46 is retracked from the passageways. The undercut portions in the fixed platen retain the moulded objects in the fixed platen when the center plate 34 is in turn moved to the left by means to be described when moulding has been completed and it is desired to eject the moulded objects. When movable platen 20 and center plate 34 have been opened up to the desired fixed spacing the knockout plates are operated to eject the moulded articles.

The mechanism for moving the center plate 34 and knockout plates 12 and 13 will now be described. Various combinations and arrangements are utilized as described in accordance with my invention.

Referring first to Figure 4, it will be observed that surrounding the guide pin 35 there being four in number, is a compressed spring member 56 and that stop pins 36 provided with enlarged heads 36' are fixed to the fixed platen 10. As the movable platen moves to the left in Figure 1 or upwardly in Figure 4 the springs 56 exert a pressure against the center plate 34 to push the plate away from the fixed platen as the movable platen moves to open position. The movement of the center plate is limited by the stop pins 36 to the desired open spacing. The movable platen continues to move to its predetermined open spacing in accordance with V hydraulic mechanism of V machine. The knockout plates 12, 13, in fixed platen 10 may be operated by means of the hydraulic cylinders 57 having pistons 58 fixed to plates 12, 13 for moving the knockout plates 12, 13. The ejector rod 26 may be operated in various ways to move knockout plates 22, 23. This action of course forces the knock pins against the various molded parts.

In a modification shown for example in Figure 5, attached to the knockout plate 12 is a boss 53 supporting a rod 51, having the head 52. The movable platen member has affixed thereto an apertured boss 50 through which the rod 51 extends. In this arrangement no springs are utilized for opening the center plate, this being accomplished by the hydraulic cylinder 61 having the rod 60 connected to plate 34. As the movable platen 20 moves away in accordance with its operation it picks up rod 52 with the boss 50 to move knockout plates 12, 13 after the center plate 34 has been moved by cylinder 61, it being necessary to synchronize the operation so that the middle plate and center plate move away prior to the operation of the knock out plates.

In Figure 6 I show a still further modification of my invention for operating the center plate as well as the knockout plate in different arrangement. A hydraulic cylinder 67 is provided with a stepped piston rod 65 provided with shoulder 66. After the movable platen member has been opened, hydraulic piston 67 is operated so as to move the center plate against its stop pin 36. The shoulder on the piston rod engages the knockout plate to move the knockout pins against the moulded objects to eject the same.

While certain specific embodiments have been described, it will be understood that various changes and modifications may be made therein without departing from the spirit and scope of the invention.

I claim:

1. Apparatus for injection molding including a stationary platen having a plurality of cavity molds, a movable platen having a plurality of cavity molds, a movable intermediate plate cooperating with both of said platens, ejector means carried by each of said platens, means for moving said movable platen and other means for moving said ejector means when said movable platen and said intermediate plate are moved away from said stationary platen and from each other for ejecting molded articles, said stationary platen having a passageway extending therethrough and said plate having passageways extending therethrough connected with said passageway of said stationary platen and with said molds for directing plastic material into said molds.

2. Apparatus for injection molding including a stationary platen having a plurality of cavity molds, a movable platen having plurality of cavity moulds, a movable intermediate plate cooperating with both of said platens and in contact with each platen during molding operations, ejector plates carried by each of said platens and movable with respect to said platens, means for moving said movable platen and other means for moving each of said ejector plates when said movable platen and said intermediate plate are moved away from said stationary platen and from each other for ejecting molded articles, and means for limiting movement of said intermediate plate, said stationary platen having a passageway extending therethrough and said plate having passageways extending therethrough connected with said passageway of said stationary platen and with said molds for directing plastic material into said molds.

3. Apparatus for injection molding including a stationary platen having a plurality of cavity molds in one face thereof, a movable platen having plurality of cavity molds in one face thereof oppositely disposed to said first mentioned face, an intermediate plate cooperating with both of said platens and contacting said faces to close said molds during molding operation, ejector plates carried by each of said platens, means for moving said movable platen and said plate and other means for moving each of said ejector plates when said movable platen and said intermediate plate are moved away from said stationary platen and from each other for ejecting moulded articles from said cavity molds, said stationary platen having a passageway extending therethrough and said plate having passageways extending therethrough connected with said passageway of said stationary platen and with said molds for directing plastic material into said molds.

4. Apparatus for injection molding including a stationary platen having a plurality of cavity moulds, a movable platen having a plurality of cavity molds, a movable intermediate plate cooperating with both of said platens, runners in said platens and in said plate for directing plastic material into said molds, said plate having a sprue hole therethrough connected to the runners in said movable platen for first directing material into the molds in said movable platen, said plate having other passageways therethrough connected between the runners in both platens for directing plastic material from said movable platen into the runners and molds in said fixed platen, ejector plates carried by each of said platens, means for moving said movable platen and said plate and other means for moving each of said ejector plates when said movable platen and said plate are moved away from said stationary platen and from each other for ejecting moulded articles.

5. Apparatus for injecting molding including a stationary platen having a plurality of cavity moulds, a movable platen having a plurality of cavity molds, a movable intermediate plate cooperating with both of said platens, runners in said platens and in said plate for directing plastic material into said molds, said fixed platen having a projection having a sprue hole therethrough, said plate having an aperture through which said projection extends, said sprue hole communicating with the runners in said movable platen, said plate having other passageways communicating with the runners in said fixed platen whereby plastic material directed through said sprue hole passes first into said cavity molds in the movable platen and then into the cavity molds in said fixed platen, ejector means carried by each of said platens, means for moving said movable platen and said plate and other means for moving each of said ejector plates when said movable platen and said plate are moved away from said stationary platen and from each other for ejecting moulded articles.

6. Apparatus for injection molding including a stationary platen having a plurality of cavity molds, a movable platen having a plurality of cavity molds, a movable intermediate plate cooperating with both said platens, means for moving said movable platen, ejector plates carried by each of said platens, means for moving said movable platen and other means for moving each of said ejector plates when said movable platen and said plate are moved away from said stationary platen and from each other for ejecting molded articles, means including a stop rod on said fixed platen for limiting movement of said plate, spring means supported on said fixed platen for moving said plate against said stop rod when said movable platen moves away from said fixed platen, said platens and said plate having runners therein for directing plastic material to said molds, said plate having passageways therethrough communicating with said runners.

7. Apparatus for injection molding including a stationary platen having a plurality of cavity molds, a movable platen having a plurality of cavity molds, a movable intermediate plate cooperating with both of said platens, means for moving said movable platen, ejector plates carried by each of said platens, means for moving said movable platen and other means for moving each of said ejector plates when said movable platen and said plate are moved away from said stationary platen and from each other for ejecting molded articles, means including a stop rod on said fixed platen for limiting movement of said plate, spring means supported on said fixed platen for moving said plate against said stop rod when said movable platen moves away from said fixed platen, said platens and said plate having runners therein for directing plastic material to said molds, said plate having passageways therethrough communicating with said runners, means for moving said ejector plates including hydraulically operated piston members.

THEODORE SAULINO.

REFERENCES CITED

The following references are of record in the file of this patent:

UNITED STATES PATENTS

| Number | Name | Date |
|---|---|---|
| 1,968,826 | Graf | Aug. 7, 1934 |
| 1,971,850 | Ernst | Aug. 28, 1934 |
| 2,331,015 | Dawes et al. | Oct. 5, 1943 |